United States Patent
Nai et al.

(10) Patent No.: US 7,456,538 B2
(45) Date of Patent: Nov. 25, 2008

(54) REACTION BALANCED ROTARY DRIVE MECHANISM

(75) Inventors: Kenneth Cheng-Hoe Nai, Edinburgh (GB); Nicholas John Weston, Gwent (GB); Geoffrey McFarland, Gloucestershire (GB); David Roberts McMurtry, Gloucestershire (GB)

(73) Assignee: Renishaw PLC, Gloucestershire (GB)

( * ) Notice: Subject to any disclaimer, the term of this patent is extended or adjusted under 35 U.S.C. 154(b) by 94 days.

(21) Appl. No.: 10/497,392

(22) PCT Filed: Dec. 16, 2002

(86) PCT No.: PCT/GB02/05691

§ 371 (c)(1),
(2), (4) Date: Jun. 1, 2004

(87) PCT Pub. No.: WO03/052287

PCT Pub. Date: Jun. 26, 2003

(65) Prior Publication Data

US 2005/0067908 A1   Mar. 31, 2005

(30) Foreign Application Priority Data

Dec. 15, 2001   (GB) ................... 0130021.9

(51) Int. Cl.
*H02K 16/00*   (2006.01)
(52) U.S. Cl. .................... 310/114; 310/112
(58) Field of Classification Search .......... 310/112–114
See application file for complete search history.

(56) References Cited

U.S. PATENT DOCUMENTS

| | | | | |
|---|---|---|---|---|
| 4,375,047 A | * | 2/1983 | Nelson et al. ............... | 310/114 |
| 4,636,960 A | * | 1/1987 | McMurtry ................... | 700/193 |
| 4,723,735 A | * | 2/1988 | Eisenhaure et al. ......... | 244/165 |
| 4,755,700 A | * | 7/1988 | Yongning et al. ........... | 310/114 |
| 4,785,213 A | * | 11/1988 | Satake ......................... | 310/114 |
| 5,012,170 A | * | 4/1991 | Atlas ........................... | 318/611 |
| 5,042,753 A | * | 8/1991 | Atlas ........................... | 310/114 |
| 5,357,180 A | * | 10/1994 | Speicher ...................... | 310/114 |
| 5,550,413 A | * | 8/1996 | Bernus et al. ................ | 310/114 |
| 5,813,823 A | | 9/1998 | Hofmeister | |
| 6,297,575 B1 | * | 10/2001 | Yang .......................... | 310/266 |
| 6,633,051 B1 | * | 10/2003 | Holloway et al. ....... | 250/559.29 |
| 6,633,143 B2 | * | 10/2003 | Weston et al. ............... | 310/114 |
| 6,737,778 B2 | * | 5/2004 | Daikoku et al. ............. | 310/112 |

FOREIGN PATENT DOCUMENTS

FR   2 772 207   6/1999
WO   WO 01/57473 A1   8/2001

\* cited by examiner

*Primary Examiner*—Dang D Le
(74) *Attorney, Agent, or Firm*—Oliff & Berridge, PLC

(57) ABSTRACT

A rotary drive mechanism is disclosed comprising a housing (10), a first motor (12) having a first rotor (38) and a first stator (32) connected to the housing and a second motor (50) having a second rotor (52) and a second stator (54) connected to the housing characterised in that the second motor is mechanically independent of the first motor whereby acceleration torques of the first motor are at least partially inertia balanced by the second motor. The balancing may be effected by equal and opposite rotation of the second motor. Control means may be provided to provide the second motor with a current which is proportional to that supplied to the first motor. Also disclosed is a positioning device and a probe having the rotary drive mechanism.

17 Claims, 4 Drawing Sheets

REACTION BALANCED ROTARY DRIVE MECHANISM

The invention relates to reaction balancing in rotary drive mechanisms.

In particular the invention relates to an articulating probe head in which the rotary accelerations of parts of the head during a measuring operation using the probe, are balanced, so that the reaction forces on the housing of the probe head, and thus the machine on which the head is mounted, are substantially reduced.

It is known from our International Publication No. WO01/57473A1, to inertia balance acceleration forces produced by a motor in an articulating probe head by providing a free-spinning stator in the motor. The free-spinning stator accelerates with equal and opposite momentum when the rotor of the motor is accelerated. To prevent the free-spinning stator from overspeeding when power is applied to the main drive rotor to overcome external forces on the probe, e.g. probing friction or gravity, an additional motor is provided having a winding assembly and a magnet assembly, one of which is provided on the free-spinning stator, the other one of which is provided on the housing.

This additional motor, referred to as a "back to earth (BTE)" motor, provides a continuously adjustable braking force on the free-spinning stator, which increases as the error in rotational speed of this stator increases and also enables power to be provided to overcome external forces by supplying current to the additional motor.

A problem associated with this design is that the tolerances on the bearings supporting the free-spinning stator and the main drive motor have to be very tight.

This is because one part of the BTE motor is mounted on part of the main drive motor, and any sideways, or tilting movements of the free spinning stator, or of the main drive rotor, change the distances between the magnets and coils of the two motors. This affects the position in three degrees of freedom and the orientation in two degrees of freedom of the axis of rotation of the main drive rotor, which, in turn, affects the position of a stylus of a measuring probe carried by the head, and produces measurement errors.

However, bearings manufactured to such tight tolerances e.g. air bearings, are expensive to produce, and can never fully overcome the problem because they have a finite lateral stiffness, and there will always, therefore, be some distortion of the bearing caused by the magnetic and other forces on the bearings.

An alternative solution would be to provide encoders on the additional motor to map the relative positions of the magnets and windings as they rotate relative to each other (such encoders already being provided on the output shaft and housing to determine the position of the output shaft for measurement purposes). However, it is not sufficient to map the positions of the two rotating systems independently, because it is necessary to know the relative positions of the windings and magnets of the BTE motor for each position of the main drive rotor. This is in order to deduce the position in three degrees of freedom, and the orientation in two degrees of freedom, of the axis of rotation of the main drive rotor. This is not a trivial task.

These problems are overcome in accordance with the present invention (at least in the preferred embodiments) by providing a second motor in place of the rotating stator assembly of the prior art system, the second motor being mechanically independent of the main drive motor and being driven in the opposite direction. This enables acceleration torques of the first motor to be at least partially inertia balanced by the second motor i.e. the acceleration torques of the first motor are partially counterbalanced by opposite accelerations of the second motor. In a preferred embodiment the first motor is substantially inertia balanced by the second motor. Preferably, the inertia balancing is effected by equal and opposite rotation of the second motor with respect to the first motor. The position of the rotor of the main drive motor in three degrees of freedom, and its orientation in two degrees of freedom, can then be mapped independently of the orientation of the rotor of the inertia balancing motor.

Preferably, control means are provided to control a supply of power to each motor.

Thus, when rapidly increasing transient currents are applied to the main drive motor to cause a relatively rapid acceleration of the head during measurement operations, a proportional current can be applied to the second motor. It may be desirable to cause substantially the same acceleration of its rotor in the opposite direction. The value of this proportional current will be a function of the relative masses that each motor drives i.e. it could be less than, more than or equal to the current supplied to the first motor. The reactions in the housing of the probe head will be equal and opposite and therefore will sum to zero, so that substantially no forces will be reacted on the machine due to these accelerations. Thus the invention provides a rotary drive mechanism in which the reaction forces due to rotary accelerations of the main drive motor are balanced.

The main advantage of the rotary drive mechanism of the invention is that any relative sideways movement, or change in direction, of the axis of rotation of the winding/magnet assembly of either of the motors, due to tolerances in the bearings, or due to elasticity in the rotors, has no effect on the other motor. This in turn makes it easier to error map the mechanism.

A further feature of the mechanism of the present invention arises in connection with external forces applied to the mechanism via the housing, for example a probe. Such forces will cause the main drive rotor to slow down, and thus its control system will supply more current to the mechanism to overcome such forces. This additional current, if applied to the second motor, would cause it to overspeed, because it has no external forces applied to it. But, because its power supply is independently controlled, this additional current is not applied to the second motor. By this means the speed of the second motor can be controlled, along with the forces which it applies to the housing.

The invention will now be more particularly described, by way of example only, with reference to the accompanying drawings in which.

Figure 1:
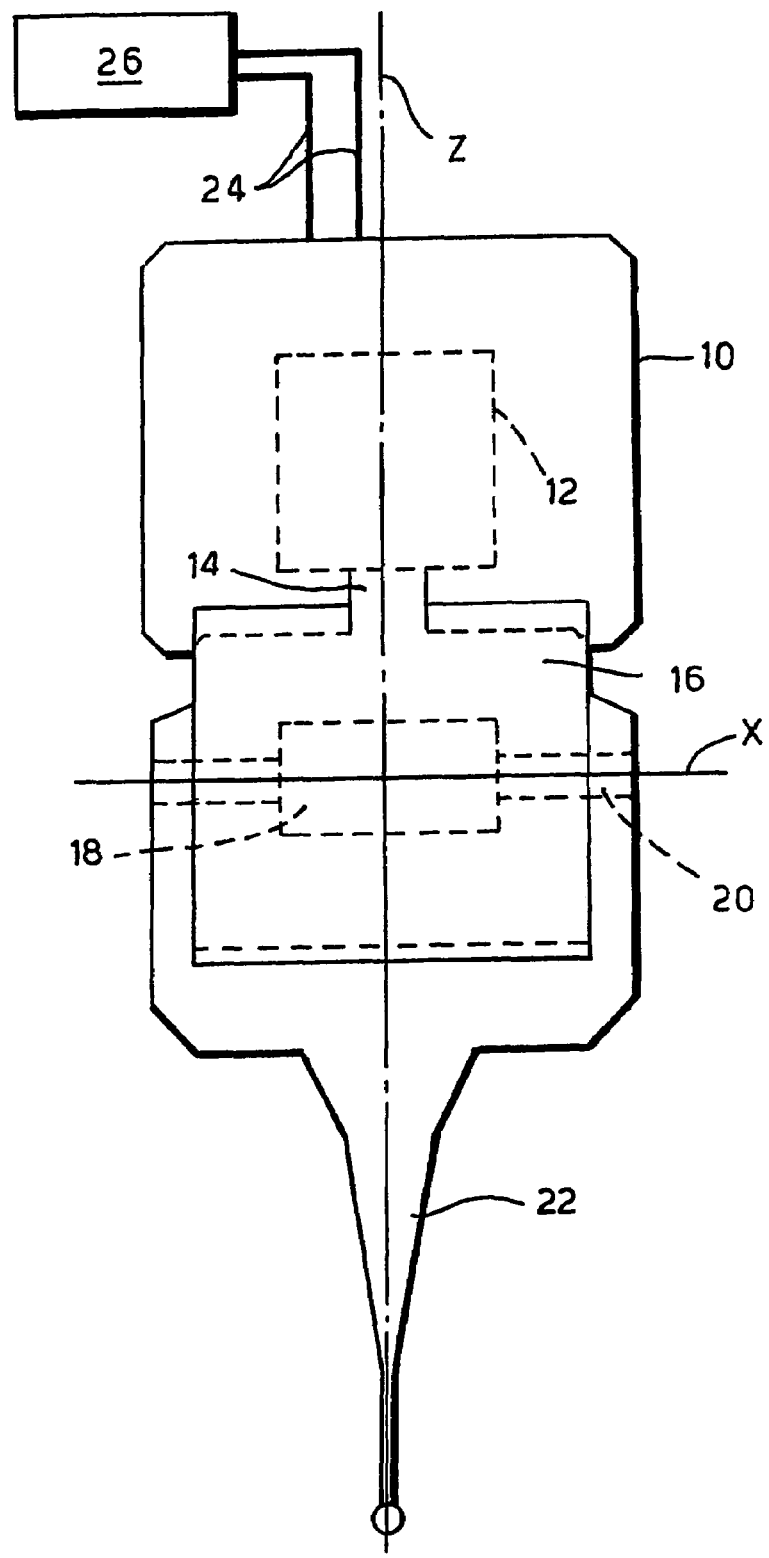
FIG. 1 is a diagrammatic illustration of an articulating probe head incorporating the invention.
Figure 4:
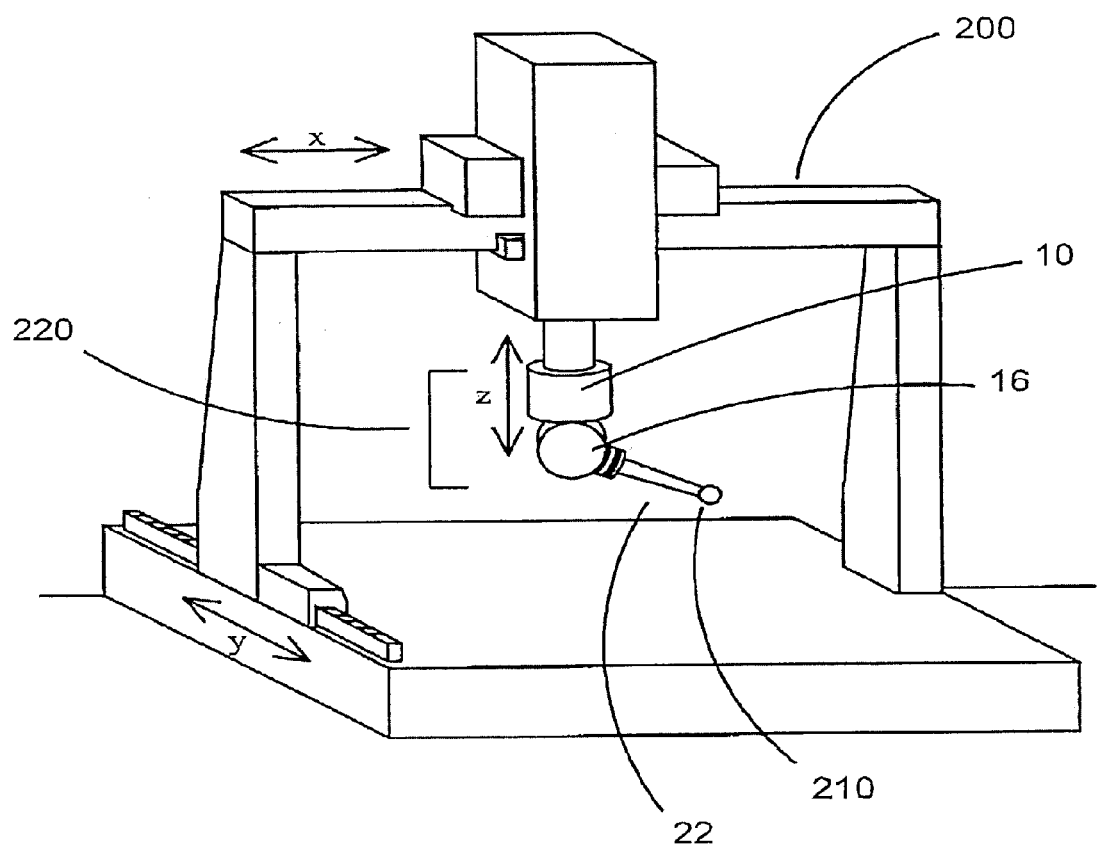
FIG. 4 is a perspective view of a surface sensing stylus on an articulating head, mounted on a coordinate measuring machine.

Referring now to the drawings, in FIG. 1 there is shown an articulating probe head which comprises a first housing part 10 adapted for attachment to a position determining apparatus 200, as shown in FIG. 4. Housing part 10 contains a rotary drive mechanism of the present invention which includes a motor 12 to provide rotation of an output shaft 14 about a first axis z. Attached to the shaft 14 is a second housing part 16 which contains a second rotary drive mechanism including a motor 18 to provide rotation of a second shaft 20 about a second axis x orthogonal to the first axis z.

Attached to the second shaft for rotation therewith is a surface sensing device (or stylus) 22 which, in a typical scanning operation, is driven over the surface of a workpiece to enable measurements to be made of points on the workpiece surface.

Power is supplied to the rotary drive mechanisms through electrical connections 24, from a controller 26 which is programmed to control the surface sensing device to move over the surface of a workpiece in a desired series of moves. Transducers within the head send signals indicative of the angular positions of the drive mechanisms about their respective axes back to servo control loops in the controller. These signals together with signals from the measuring devices of the machine on which the head is mounted, enable the relative positions of the surface sensing device and a workpiece surface to be accurately controlled.

As explained above, reactions on the housings of the head caused by oscillating motions of the stylus 22 and its rotary drive mechanisms, are reduced by using an additional (inertia balancing) motor in at least one of the rotary drive mechanisms.

FIG. 4 shows a perspective view of the surface sensing device (stylus) 22 attached to the second shaft of an articulating probe head 220. In this embodiment the surface sensing device (stylus) 22 has a surface contacting tip 210 at its distal end. The articulating probe head 220 is mounted by its first housing part 10 on to a coordinate measuring machine 200.

Figure 2:
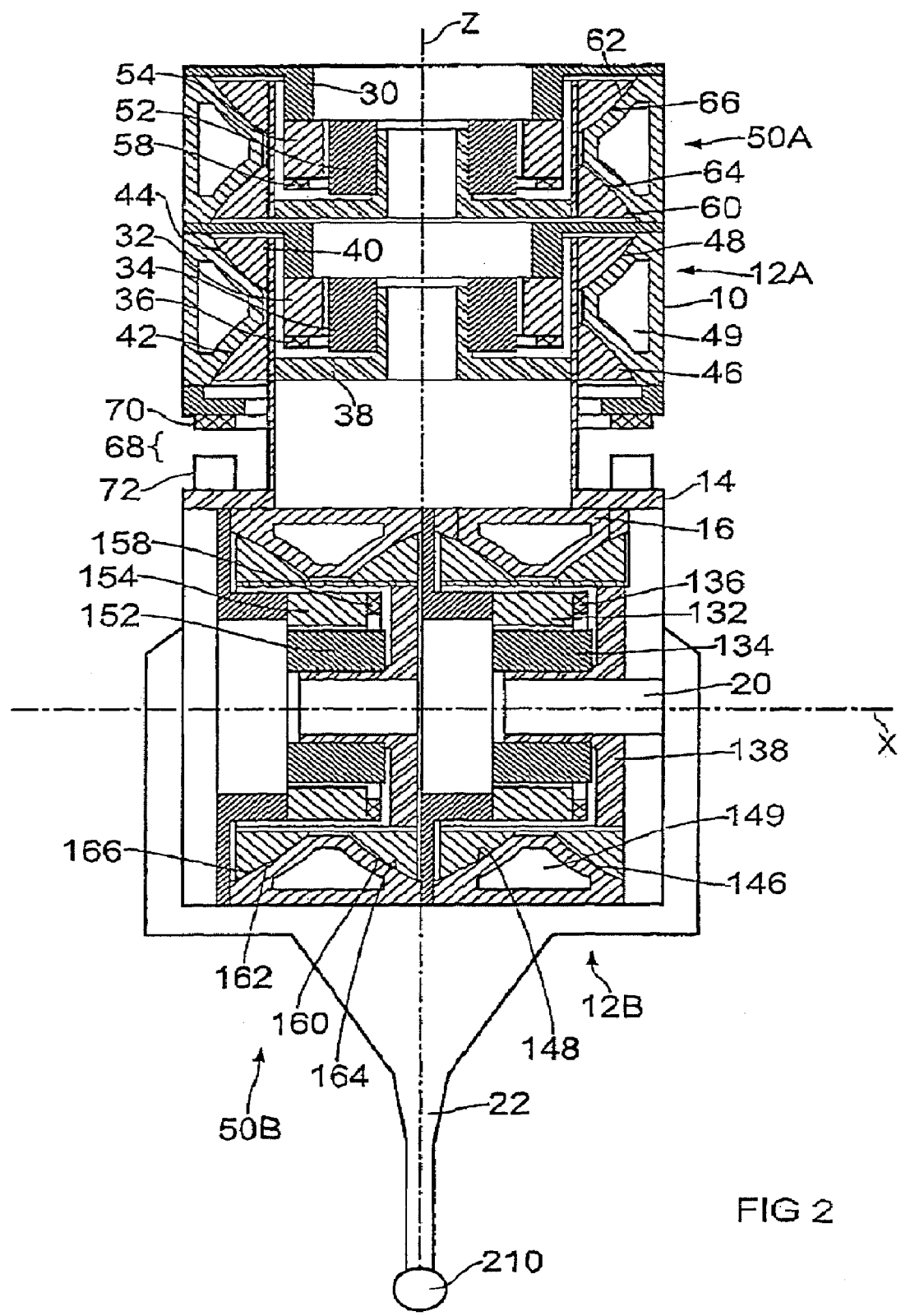
FIG. 2 is a cross-sectional elevation through the motors of a probe head.

Referring now to FIG. 2 details of a rotary drive mechanism incorporating the inertia balancing motor of the present invention are illustrated. FIG. 2, shows the invention applied to both rotary mechanisms of the articulating head. It is to be understood however, that the following description can be applied to either one, or both of the rotary drive mechanisms of the articulating head for use with a positioning device.

The first rotary drive mechanism is contained within a housing 10 which includes a flange 30 to enable the housing to be connected to the quill of a measuring machine, or to the housing of the other rotary drive mechanism.

The mechanism shown consists of a main drive motor 12 having a main drive magnet assembly 32 and a main drive winding assembly 34. Power is supplied to the main drive winding assembly through a brush assembly 36 to drive the main drive rotor 38, which in this example, is connected to the main drive winding assembly. The main drive rotor 38 is connected to the output shaft 14 which is mounted for rotation on a bearing 40.

In this embodiment the rotary drive mechanism is mounted within the housing part 10 of the articulating head of FIG. 1, so that the flange 30 is to be connected to the machine quill and the output shaft 14 is to be connected to the second part 16. The position of the output shaft 14 is continuously monitored by an encoder 68 provided, in this example, as a rotary scale 70 mounted to the housing, and an associated read head 72. Other forms of rotary encoder may however be used.

The housing part 10 provides part-spherical bearing support surfaces 42 and 44 of the bearing 40 for supporting the rotating elements of the main drive mechanism. In this example the main drive winding assembly 34 of the main drive motor is supported for rotation on bearing surfaces 42 and 44 attached to the housing, by a pair of oppositely facing part-spherical bearing surfaces 46 and 48 on the winding assembly. The surfaces 46 and 48 are shaped to co-operate with the bearing surfaces 42 and 44 to form an air bearing which is supplied with pressurised air through nozzles from a main air duct 49.

The main drive magnet assembly 32 of the main drive motor is connected to the housing 10.

An additional independent inertia balancing motor 50 is provided within the housing 10. The inertia balancing motor consists of a rotatable winding assembly 52 and a static magnet assembly 54 which is connected to the housing 10. The winding assembly 52 is mounted for rotation by means of part-spherical bearing surfaces 60, 62 on the housing which co-operate with part-spherical surfaces 64, 66 on the winding assembly.

Power is supplied to the winding assembly 52 through brushes 58. The command is supplied from the same source as the power supplied for the main drive motor, but is supplied via an inverter which ensures that the drive demand for the inertia balancing motor is in phase with the main motor drive demand, but in the opposite direction, so that the acceleration forces of the inertia balancing motor will counterbalance those of the main drive motor.

The second housing part 16 houses a second rotary drive mechanism comprising a main drive motor 12B, and an additional independent inertia balancing motor 50B. The parts of these motors are labeled one hundred and X to correspond with the parts X of the rotary drive mechanism of the first housing part; for example, the main drive magnet assembly 32 and a main drive winding assembly 34, of motor 12A correspond to the main drive magnet assembly 132 and a main drive winding assembly 134, of motor 12B. The description above relating to the first rotary mechanism can thus be applied to the second rotary drive mechanism.

Figure 3:
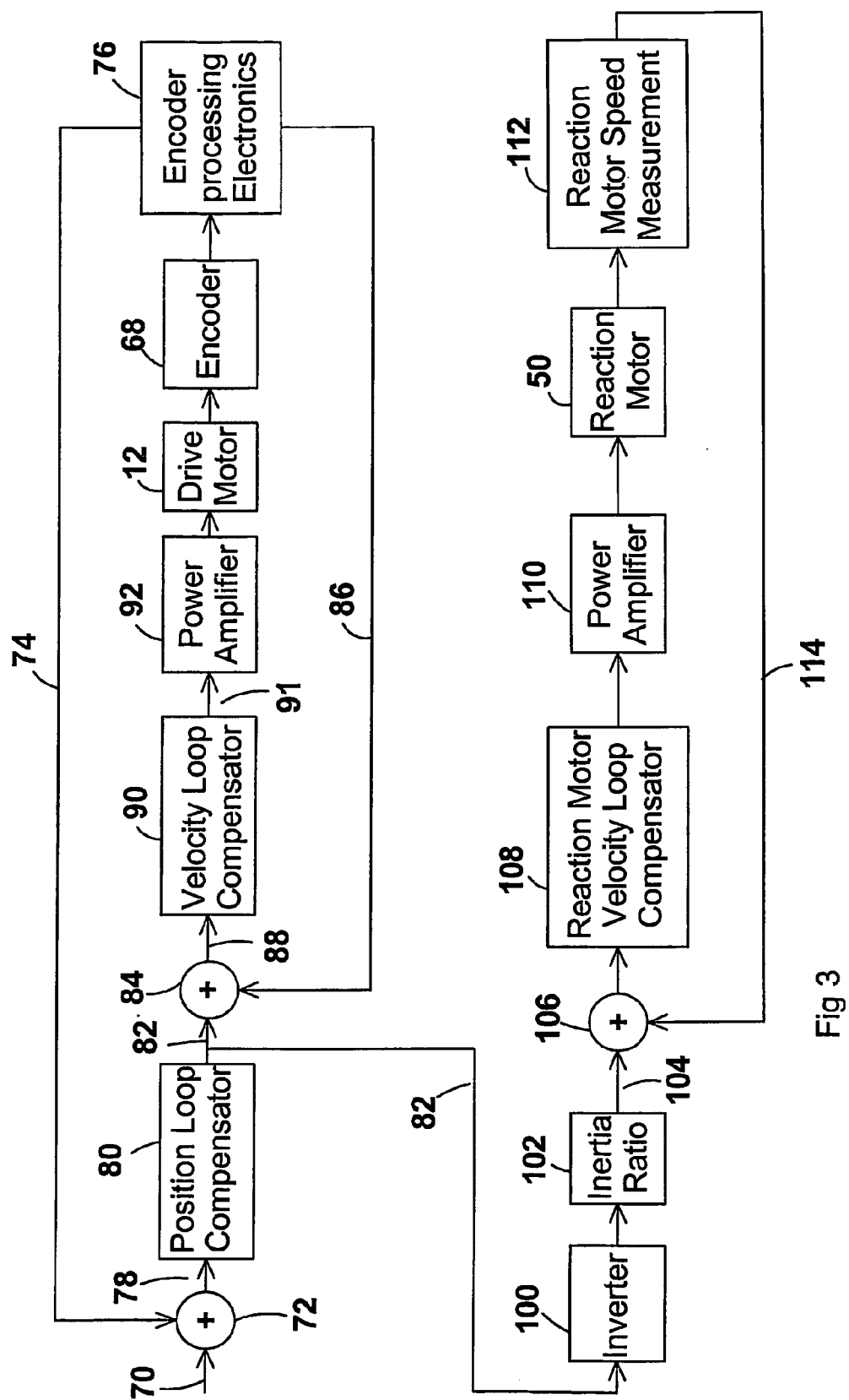
FIG. 3 is a block diagram representing the elements of a control system for the motors of the head.

The controller 26 that implements the control strategy for the inertia balanced rotary drive mechanism of the present invention has a structure shown in FIG. 3. The controller performs three main tasks, a) it controls the position of the main drive rotor against an input demand, and b) it controls the velocity of the inertia balancing motor in relation to the velocity of the main drive motor so as to maintain the reactionless nature of the entire drive system, and c) by divorcing the velocity control feedback loops of the two motors from each other, it allows for external forces acting on a probe connected to the probe head to be reacted into the housing.

Referring now to FIG. 3, control of rotor 38 of the main drive motor 12 is achieved using an outer position feedback loop and an inner velocity feedback loop. A position demand signal 70 is passed to a comparator 72 which receives as a second input, a position feedback signal 74 which is an output signal generated by the processing electronics 76 of the encoder 68. The comparator 72 generates an error signal 78 which is passed to a position loop compensator 80.

The position loop compensator outputs a velocity demand signal 82 which is passed to a comparator 84. The comparator 84 also receives a velocity feedback signal 86 from the encoder processing electronics 76 and derives a velocity error signal 88 which is passed to the velocity feedback loop. The velocity feedback loop operates to control the velocity of the main drive rotor 34 in order to achieve the position of the main drive rotor required by the position demand signal. The velocity feedback loop consists of a velocity loop compensator 90 and a power amplifier 92. The output of the velocity loop compensator is an acceleration demand signal 91, which is passed via a power amplifier 92 to the main drive motor 12 to drive it to the required position.

Control of the velocity of the inertia balancing motor is derived from the velocity demand signal 82 from the position loop compensator 80. The velocity demand signal 82 is additionally passed to an inverter 100 which inverts it and passes it to an inertia ratio multiplier 102. This device multiplies the inverted velocity demand signal by the ratio of the inertias of the two counter-rotating rotors 38 and 52 and produces a velocity demand signal 104 for the inertia balancing motor 50.

This strategy provides "electronic gearing" between the two rotors 38 and 52, since the effect is to slave the rotor 52 of the inertia balancing motor to that of the main drive motor so that it rotates in the opposite direction to the rotor 38 of the main drive motor but at a speed dependent upon the inertia ratio of the two rotors.

The inverted and inertia compensated velocity demand signal 104 is then passed via a comparator 106 to a velocity feedback loop for the inertia balancing motor, which consists of a velocity loop compensator 108 and a power amplifier 110, before being fed to the inertia balancing motor 50. The actual speed of the inertia balancing motor is determined by any suitable velocity determining device 112, examples of which are a tacho-generator, or simply a device which measures the voltage and current supplied to the inertia balancing motor and calculates its speed from these quantities. The measured velocity is fed back to the comparator 106 as a velocity feedback signal 114.

When an additional external torque is applied to the stylus 22 of the head due to frictional forces, for example, between the stylus 22 and a workpiece surface being measured, the main drive rotor of the motor concerned will tend to slow down. As a result the velocity feedback signal 86 from the encoder processing electronics 76 will decrease, and the velocity error signal 88 from the comparator 84 will increase. This will cause an acceleration of the main drive rotor to counter the tendency of the main drive motor to slow down, so that the stylus will move over the workpiece stylus at a constant measuring velocity.

However, because the velocity of the inertia balancing motor is controlled by its own independent velocity control feedback loop, the velocity of this motor will not be affected by the change in velocity of the main drive motor. As a result the additional reaction forces on the magnet assembly of the main drive motor caused by the external forces will not be counterbalanced by the inertia balancing motor and will be taken directly into the housing 10.

Hence, unlike the prior art device described earlier, the speed of the inertia balancing motor is dictated by the command supplied to it, and not by the power supplied to the main drive motor and hence to the BTE motor by the rotating stator.

Although this gives rise to a more complex control system which is required to control the acceleration of the inertia balancing motor to eliminate the reactions caused by accelerations of the main drive motor, the metrology of the head will be better because the bearing problems mentioned above are significantly reduced.

In one modification to the above-described control strategy, it is possible from knowledge of the relative positions of the main drive rotor and housing, (as measured by the encoder 68), to differentiate the position information twice with respect to time, to determine the acceleration of the main drive rotor at any instant. From this knowledge the current and voltage required to be supplied to the inertia balancing rotor to counter this acceleration can be calculated.

The invention claimed is:

1. A probe head having a reaction balanced rotary drive mechanism, the probe head comprising:
    a first housing part for attachment to a position determining apparatus;
    a first rotary drive mechanism to provide rotation of a first output shaft about a first axis, the first rotary drive mechanism comprising a first motor having a first rotor and a first stator connected to the first housing part, and a second motor having a second rotor and a second stator connected to the first housing part, the second motor being mechanically independent of the first motor and being driven in an opposite direction such that acceleration torques of the first motor are at least partially inertia balanced by the second motor;
    a second housing part attached to the first output shaft, the second housing part containing a second rotary drive mechanism to provide rotation of a second shaft for attachment to a surface sensing device, the second shaft being rotatable about a second axis; and
    a control system having a first control loop inside a position control loop, the position control loop supplying a demanded velocity to both the first control loop and a second control loop, the position control loop controlling a position of the first motor, and the second control loop controlling a speed of the second motor, whereby external forces acting on the surface sensing device are reacted into the first housing part.

2. A probe head according to claim 1 wherein the first motor is substantially inertia balanced by the second motor.

3. A probe head according to claim 2 wherein the inertia balancing is effected by equal and opposite rotation of the second motor.

4. A probe head according to claim 1 wherein a power supply supplies power to each motor.

5. A probe head according to claim 1 wherein a control is provided to control supply of power to each motor.

6. A probe head according to claim 5 wherein the control means provide the second motor with a current which is proportional to that supplied to the first motor.

7. A probe head according to claim 1 wherein the surface sensing device is a measurement probe.

8. A probe head according to claim 1 wherein a control is provided to control the velocity of the second motor in relation to the velocity of the first motor.

9. A probe head according to claim 1 including a control wherein each motor is controlled by its own independent velocity feedback loop.

10. A probe head according to claim 1, wherein the second rotary drive mechanism comprises a third motor having a third rotor and a third stator which is connected to the second housing part, and a fourth motor having a fourth rotor and a fourth stator connected to the second housing part, characterized in that the fourth motor is mechanically independent of the third motor and is driven in opposite direction such that acceleration torques of the third motor are at least partially inertia balanced by the fourth motor.

11. A probe head according to claim 1, wherein external forces acting on the surface sensing device are reacted through the first motor into the housing.

12. A probe head having a reaction balanced rotary drive mechanism, the probe head comprising:
    a first housing part for attachment to a position determining apparatus:
    a rotary drive mechanism to provide rotation of a surface sensing device about at least one axis,the rotary drive mechanism comprising a first motor having a first rotor and a first stator connected to the first housing part, and a second motor having a second rotor and a second stator connected to the first housing part; and
    a control system having a first control loop inside a position control loop, the position control loop supplying a demanded velocity to both the first control loop and a second control loop, the position control loop controlling a position of the first motor, and the second control loop controlling a speed of the second motor, whereby external forces acting on the surface sensing device are reacted into the first housing part.

13. A probe head according to claim 12, wherein the external forces comprise gravitational forces.

14. A probe head according to claim 12, wherein the surface sensing device is a stylus with a surface contacting tip.

15. A probe head according to claim 14, wherein the external forces comprise probing forces between the stylus and a surface in contact with the stylus.

16. A probe head having a reaction balanced rotary drive mechanism, the probe head comprising:
a first housing part for attachment to a position determining apparatus;
a first rotary drive mechanism to provide rotation of a first output shaft about a first axis, the first rotary drive mechanism comprising a first motor having a first rotor and a first stator connected to the first housing part, and a second motor having a second rotor and a second stator connected to the first housing part, the second motor being mechanically independent of the first motor and being driven in an opposite direction such that acceleration torques of the first motor are at least partially inertia balanced by the second motor; and
a second housing part attached to the first output shaft, the second housing part containing a second rotary drive mechanism to provide rotation of a second shaft for attachment to a surface sensing device, the second shaft being rotatable about a second axis, the second rotary drive mechanism comprising a third motor having a third rotor and a third stator which is connected to the second housing part, and a fourth motor having a fourth rotor and a fourth stator connected to the second housing part, the fourth motor being mechanically independent of the third motor and is driven in an opposite direction such that acceleration torques of the third motor are at least partially inertia balanced by the fourth motor.

17. A probe head having a reaction balanced rotary drive mechanism, the probe head comprising:
a first housing part for attachment to a position determining apparatus;
a first rotary drive mechanism to provide rotation of a first output shaft about a first axis, the first rotary drive mechanism comprising a first motor having a first rotor and a first stator connected to the first housing part, and a second motor having a second rotor and a second stator connected to the first housing part, the first rotor and the second rotor positioned to spin on an identical axis, the second motor being mechanically independent of the first motor and being driven in an opposite direction such that acceleration torques of the first motor are at least partially inertia balanced by the second motor; and
a second housing part attached to the first output shaft, the second housing part containing a second rotary drive mechanism to provide rotation of a second shaft for attachment to a surface sensing device, the second shaft being rotatable about a second axis.

* * * * *

UNITED STATES PATENT AND TRADEMARK OFFICE
CERTIFICATE OF CORRECTION

| | | |
|---|---|---|
| PATENT NO. | : 7,456,538 B2 | Page 1 of 1 |
| APPLICATION NO. | : 10/497392 | |
| DATED | : November 25, 2008 | |
| INVENTOR(S) | : Nai et al. | |

It is certified that error appears in the above-identified patent and that said Letters Patent is hereby corrected as shown below:

Col. 6, line 46 replace "driven in opposite direction" with --driven in an opposite direction--

Signed and Sealed this

Tenth Day of March, 2009

JOHN DOLL
*Acting Director of the United States Patent and Trademark Office*